US010012329B2

(12) United States Patent
Cox et al.

(10) Patent No.: US 10,012,329 B2
(45) Date of Patent: Jul. 3, 2018

(54) SYSTEMS AND METHODS FOR A PIPELINE ANCHOR LUG SLEEVE AND LINK

(71) Applicants: Garrie Stephen Cox, Eureka, CA (US); Neale Johannesson, Calgary (CA)

(72) Inventors: Garrie Stephen Cox, Eureka, CA (US); Neale Johannesson, Calgary (CA)

(73) Assignee: LDS LAND DEVELOPMENT SERVICES, Dripping Springs, TX (US)

(*) Notice: Subject to any disclaimer, the term of this patent is extended or adjusted under 35 U.S.C. 154(b) by 0 days.

(21) Appl. No.: 15/248,698

(22) Filed: Aug. 26, 2016

(65) Prior Publication Data

US 2017/0067580 A1 Mar. 9, 2017

Related U.S. Application Data

(60) Provisional application No. 62/213,854, filed on Sep. 3, 2015.

(51) Int. Cl.
*F16L 3/12* (2006.01)
*B60P 7/06* (2006.01)
*B60P 7/08* (2006.01)
*F16L 3/127* (2006.01)

(52) U.S. Cl.
CPC .. *F16L 3/12* (2013.01); *B60P 7/06* (2013.01); *B60P 7/0823* (2013.01); *F16L 3/127* (2013.01)

(58) Field of Classification Search
CPC ..... F16L 3/10; F16L 3/12; F16L 3/137; B60P 7/0823; B60P 7/06

USPC .......... 248/499, 534, 535, 230.1, 230.8, 65; 410/101, 106
See application file for complete search history.

(56) References Cited

U.S. PATENT DOCUMENTS

| 3,377,044 A | 4/1968 | Jackson | |
|---|---|---|---|
| 3,429,537 A | 2/1969 | Jantzen | |
| 3,747,288 A | 7/1973 | Grimelii | |
| 4,074,519 A * | 2/1978 | Garrett | B66C 1/66 248/499 |
| 5,330,300 A * | 7/1994 | Jones | B60P 7/0823 410/101 |
| 5,593,143 A * | 1/1997 | Ferrarin | E04H 17/08 248/68.1 |
| 5,730,552 A | 3/1998 | Johannesson | |
| 6,536,154 B1 | 3/2003 | Norris | |
| 6,626,621 B1 | 9/2003 | Hugg | |
| 6,974,288 B2 * | 12/2005 | Tatina | B60P 7/0807 410/106 |
| D534,792 S * | 1/2007 | Cooper | D25/133 |
| 7,503,736 B1 | 3/2009 | Chen | |
| 7,654,028 B1 | 2/2010 | Grover | |
| 7,882,601 B2 | 2/2011 | Nguyen | |
| 8,002,461 B2 | 8/2011 | Kitahara | |
| 8,172,492 B1 | 5/2012 | Kelderman | |
| 8,794,886 B1 * | 8/2014 | Nett | B60P 7/0807 410/106 |
| 2006/0153659 A1 | 7/2006 | Spradlin | |

(Continued)

*Primary Examiner* — Tan Le
(74) *Attorney, Agent, or Firm* — Pierson IP, PLLC (57) ABSTRACT

Embodiments disclosed herein describe systems and methods for a pipeline bracket with a lug sleeve and link, wherein the link is configured to couple with the lug sleeve and a tie-down strap via removable bolts. The tie-down strap may be configured to distribute the forces caused by movement of the pipeline to the pipeline bracket.

5 Claims, 11 Drawing Sheets

(56) References Cited

U.S. PATENT DOCUMENTS

2009/0057521 A1    3/2009  Boatsman
2017/0067580 A1*  3/2017  Cox .......................... F16L 3/12

* cited by examiner

SYSTEMS AND METHODS FOR A PIPELINE ANCHOR LUG SLEEVE AND LINK

CROSS-REFERENCE TO RELATED APPLICATIONS

This application claims a benefit of priority under 35 U.S.C. § 119 to Provisional Application No. 62/213,854 filed Sep. 3, 2015, which is fully incorporated herein by reference in its entirety.

BACKGROUND INFORMATION

Field of the Disclosure

Examples of the present disclosure are related to systems and methods for a pipeline anchor bracket. More particularly, embodiments relate to a pipeline anchor bracket with a lug sleeve configured to align with a corresponding link.

Background

A pipeline anchor is a designed element configured to transfer the load of a pipeline to support structures. The pipeline anchor may also be configured to anchor, guide, absorb shock, and support the pipeline load. The load may include the weight of the pipeline, the content that the pipeline carries, pipeline fittings attached to the pipeline, etc.

Due to the length of conventional pipelines, the pipeline is required to be anchored at various intervals to provide buoyancy control and reduce movement of the pipelines. Movement of the pipeline results in degradation of the pipeline and corresponding elements, which leads to leaks, environmental damage, and/or other hazards.

To provide buoyancy control, and reduce movement of the pipeline, conventional pipeline anchors may utilize tie-down straps that are coupled to pipeline anchor brackets. The tie-down straps are then coupled to the anchors and positioned around portions of the circumference on the pipelines at the intervals. The tie-down straps may be utilized to limit the vertical movements of the pipelines when the pipelines are anchored. Currently tie-down straps are permanently coupled to conventional pipeline brackets. However, due to the need for interchangeable strap widths and lengths, and in the interest of cost savings, a removable linkage is desired Accordingly, needs exist for more effective and efficient systems and methods for a pipeline anchor with a lug sleeve and link, wherein the link is configured to couple with the lug sleeve and a tie-down strap via removable bolts.

SUMMARY

Embodiments disclosed herein describe systems and methods for a pipeline bracket with a lug sleeve or bracket (referred to hereinafter individually and collectively as "lug sleeve") and link, wherein the link is configured to couple with the lug sleeve and a tie-down strap via removable bolts. The tie-down strap may be configured to distribute the forces caused by movement of a pipeline to the pipeline bracket and/or link.

In embodiments, the lug sleeve may be configured to couple with an extension rod of a pipeline anchor via an extension orifice, wherein the extension orifice may extend from an upper surface of the lug sleeve to a lower surface of the lug sleeve. The lug sleeve may also include at least one projection. The projection may extend in a direction perpendicular to the first orifice. The projection may include a first mounting orifice that extends through the projection, from a first side of the projection to a second side of the projection. In embodiments, a mounting bolt may be configured to be positioned through the first mounting orifices to couple the lug sleeve and the link.

The link may be configured to couple with the lug sleeve and/or at least one tie-down strap. The link may include a first side and a second side.

The first side of the link may include a plurality of coupling mounts, wherein a first coupling mount and a second coupling mount are positioned adjacent to opposite sides of the projection. A distance between the first coupling mount and the second coupling mount may be at least as long as the width of the projection. The first coupling mount and a second coupling mount may be configured to encompass the sidewalls of the projection.

The first coupling mount and the second coupling mount may include second mounting orifices. The second mounting orifices may be configured to align with the first mounting orifice. In embodiments, a first mounting bolt may be positioned through the second mounting orifices on the link and the first mounting orifice through the projection to couple the link and the lug sleeve. Responsive to coupling the link and the lug sleeve, the link may be configured to rotate around an axis defined by the first mounting bolt, wherein the axis is perpendicular to the direction of the extension rod.

In embodiments, the second side of the link may include a plurality of tie-down mounts. A first tie-down mount and a second tie-down mount may extend in opposite directions as the first coupling mount and the second coupling mount. The first tie-down mount and the second tie-down mount may include third mounting orifices. In embodiments, a second mounting bolt may be positioned through the third mounting orifices, wherein a tie-down strap may be coupled to the second mounting bolt. Responsive to coupling the tie-down strap with the link, the link may be rotated around the axis defined by the first mounting bolt to best position the tie-down strap around a pipeline.

These, and other, aspects of the invention will be better appreciated and understood when considered in conjunction with the following description and the accompanying drawings. The following description, while indicating various embodiments of the invention and numerous specific details thereof, is given by way of illustration and not of limitation. Many substitutions, modifications, additions or rearrangements may be made within the scope of the invention, and the invention includes all such substitutions, modifications, additions or rearrangements.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present disclosure. Also, common but well-understood elements that are useful or necessary in a commercially feasible embodiment are often not depicted in order to facilitate a less obstructed view of these various embodiments of the present disclosure.

DETAILED DESCRIPTION

In the following description, numerous specific details are set forth in order to provide a thorough understanding of the present embodiments. It will be apparent, however, to one having ordinary skill in the art that the specific detail need not be employed to practice the present embodiments. In other instances, well-known materials or methods have not been described in detail in order to avoid obscuring the present embodiments.

Embodiments disclosed herein describe systems and methods for a pipeline bracket with a lug sleeve and link. The link may be configured to couple with the lug sleeve and a tie-down strap via removable bolts. The tie-down strap may be configured to distribute the forces caused by movement of the pipeline to the pipeline bracket.

Figure 1:
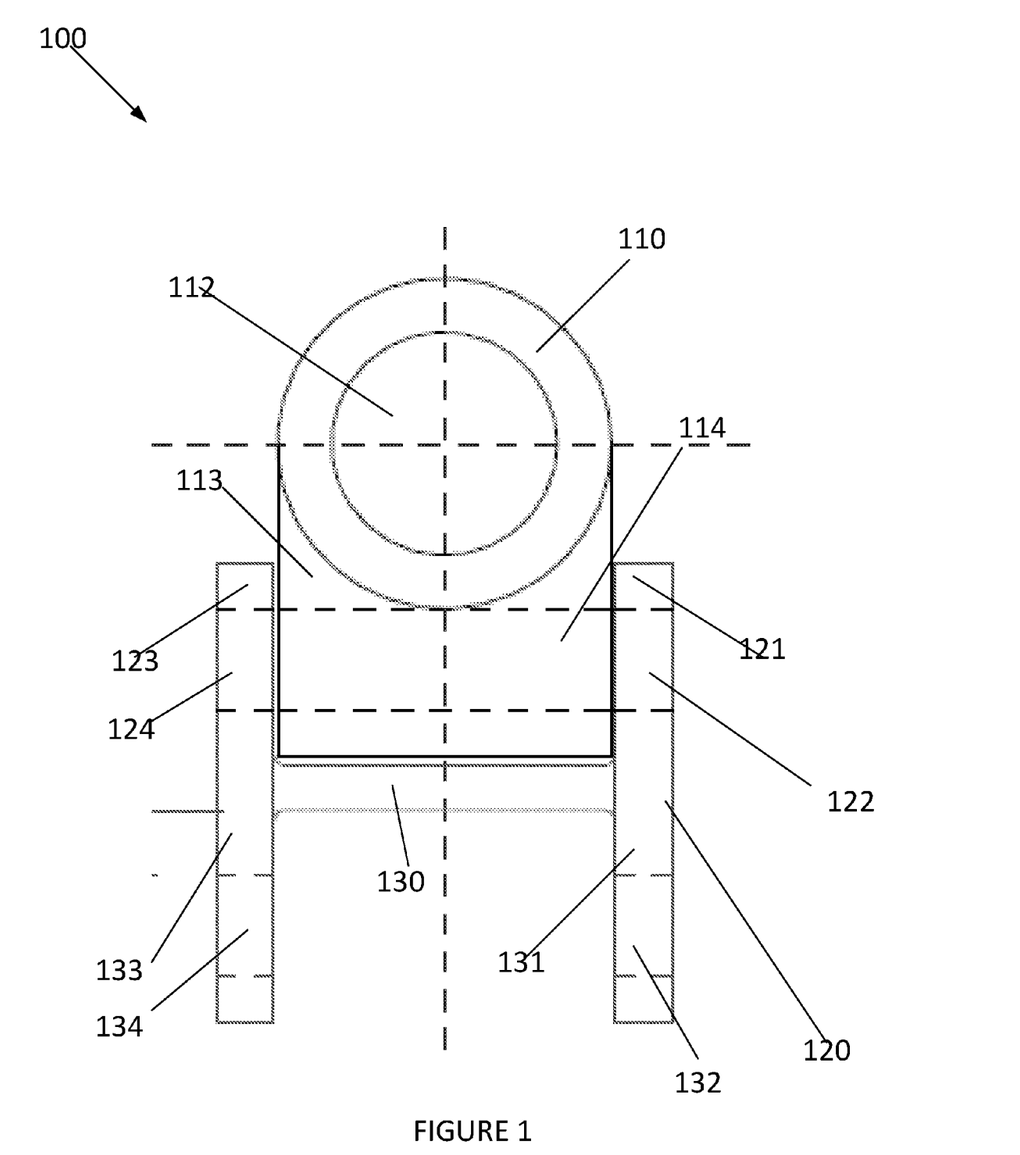
FIG. 1 depicts a pipeline system, according to an embodiment.

FIG. 1 depicts a pipeline system 100, according to an embodiment. Pipeline system 100 may include lug sleeve 110 and link 120.

Lug sleeve 110 may be configured to couple with an extension rod of an anchor. Lug sleeve 110 may be configured to slide along the extension rod to be positioned at a desirable vertical offset along the extension rod to secure a pipeline in place. Lug sleeve 110 may include an extension orifice 112 that extends through the lug sleeve from an upper surface of lug sleeve 110 to a lower surface of lug sleeve 110. In embodiments, extension orifice 112 may have a circumference that is smaller than an outer circumference of lug sleeve 110.

Lug sleeve 110 may include projection 113. Projection 113 may be configured to extend away from lug sleeve 110 in a first direction that is perpendicular to extension orifice 112. A proximal portion of projection 113 may include rounded edges extending across half of the outer circumference of lug sleeve 110. A distal portion of projection 113 may include a rounded edge. Projection 113 may also be defined by two planar sidewalls that extend in parallel to each other.

Projection 113 may include a mounting orifice 114. Mounting orifice 114 may extend through projection 113 from the first planar sidewall to the second planar sidewall, creating a hollow passageway through projection 113. Mounting orifice 114 may be positioned in a second direction that is perpendicular to extension orifice 112. Mounting orifice 114 may be configured to receive a removable first mounting bolt, which may couple lug sleeve 110 with link 120. One skilled in the art will appreciate that mounting orifice 114 may be positioned at any location between the proximal and distal end of projection 113.

Link 120 may be a device that is configured to couple lug sleeve 110 and a tie-down strap (not shown). In embodiments, link 120 may be "H" shaped. However, in other embodiments, link 120 may be any desired shape and/or size, such as "Y" shaped. Responsive to coupling link 120 with lug sleeve 110 and the tie-down strap, link 120 may be rotated around an axis such that the tie-down strap may be positioned around a pipeline. Because link 120 is configured to rotate around the axis defined by mounting orifice 114, link 120 may effectively and efficiently secure pipelines of a plurality of shapes and/or sizes.

Link 120 may include a first end and a second end, wherein the first end and the second end are coupled together via coupling mechanism 130. Coupling mechanism 130 may be a tube, channel, shaft, etc. extending across a width of link 120. In embodiments, coupling mechanism 130 may be comprised of multiple portions with different widths to accommodate for straps having different widths. For example, a first portion of coupling mechanism 130 may have a width that corresponds to the width of projection 113, while a second portion of coupling mechanism 130 may have a width that is smaller than, equal to, or larger than the width of projection 113.

The first end of link 120 may include a plurality of coupling mounts 121, 123. First coupling mount 121 and second coupling mount 123 may be configured to be positioned on opposite sides of projection 113. Both first coupling mount 121 and second coupling mount 123 may be configured to be positioned adjacent to projection 113 when projection 113 is inserted into first end of link 120. In embodiments, the distance between first coupling mount 121 and second coupling mount 121 may be approximately the same distance as the width of projection 113. Accordingly, the first side of link 120 may encompass the sidewalls of projection 113 if projection 113 is positioned between first coupling mount 121 and second coupling mount 123.

First coupling mount 121 may include mounting orifice 122, and second coupling mount 123 may include mounting orifice 124. Mounting orifices 122, 124 may be aligned with each other. When mounting orifices 114, 122, 124 are aligned, a first mounting bolt may be positioned through mounting orifices 114, 122, 124 to couple link 120 with lug sleeve 110. Responsive to coupling link 120 and lug sleeve 110, link 120 may be configured to rotate around an axis defined by the first mounting bolt. When rotating link 120 may not be configured to rotate one hundred sixty degrees.

The second end of link 120 may be configured to couple with a tie-down strap, and the second end of link 120 may include a plurality of tie-down mounts 131, 133. A first tie down mount 131 and a second tie down mount 133 may be configured to extend in opposite directions, with respect to coupling mechanism 130, of the first coupling mounts 121, 123. First tie-down mount 131 and second tie-down 133 mount may include a plurality of mounting orifices 132, 134. In embodiments, a second mounting bolt may be positioned through the mounting orifices 132, 134, wherein a tie-down strap may be coupled to the second mounting bolt. Responsive to coupling the tie-down strap with the second mounting bolt, the link 120 may be rotated around the axis defined by the first mounting bolt to best position the tie-down strap around a pipeline.

Figure 2:
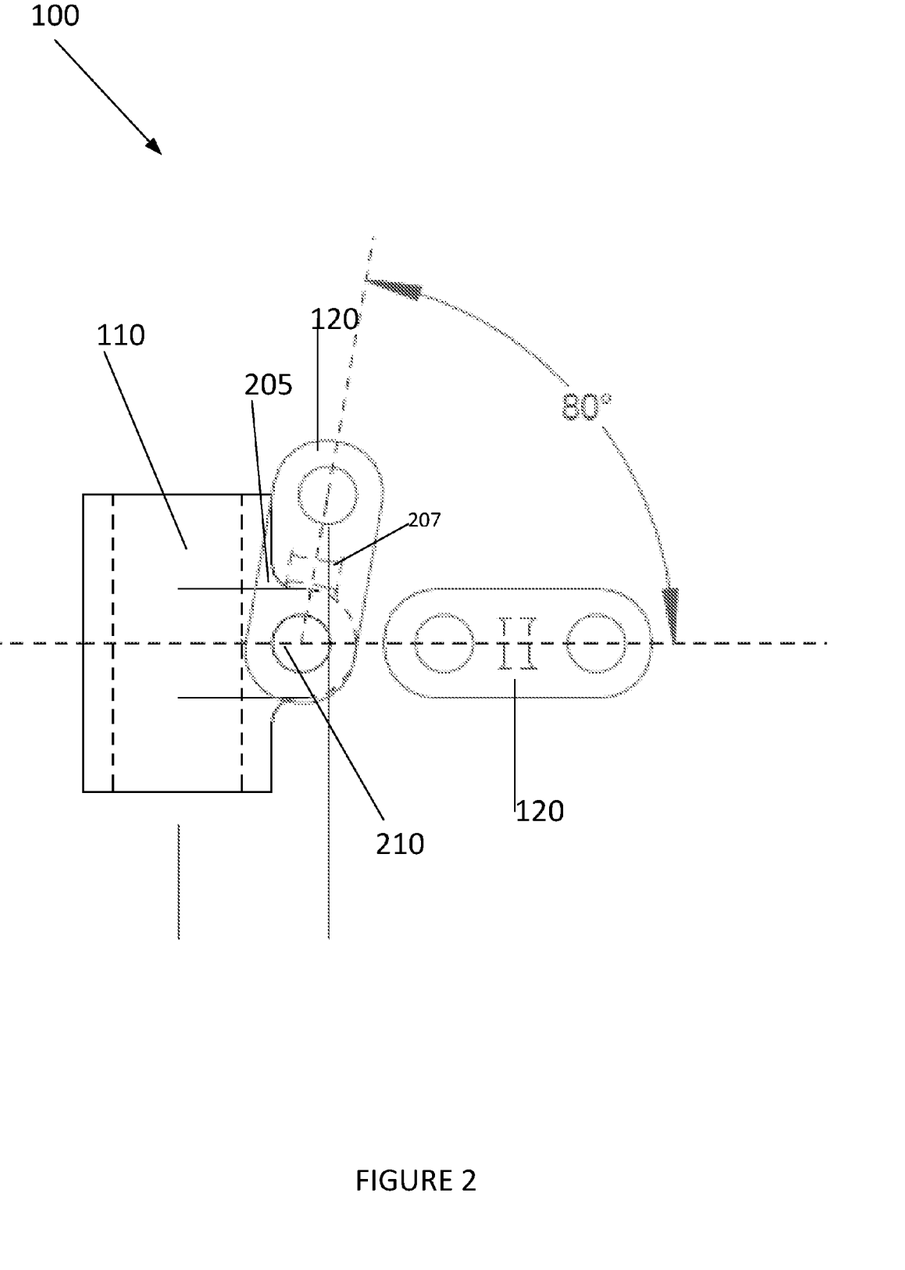
FIG. 2 depicts a side view pipeline system, according to an embodiment.

FIG. 2 depicts a side view pipeline system 100, according to an embodiment. Elements depicted in FIG. 2 may be substantially similar to other elements described elsewhere. For the sake of brevity, an additional description of these elements is omitted.

As depicted in FIG. 2, link 120 may be configured to rotate around an axis 210 defined by the first mounting bolt. In embodiments, link 120 may be configured to rotated one hundred sixty degrees. In certain embodiments, link 120 may be not be configured to rotate a full one hundred eighty degrees. Accordingly, a sidewall of link 120 may not be positioned upright against a sidewall of pipeline bracket 110. Therefore, when a pipeline is positioned above pipeline bracket 110, a tie-down strap coupled to a mounting bolt positioned through mounting orifices 132, 134 may wrap around the pipeline at an upward and outward angle.

In embodiments, pipeline bracket 110 may include a plurality of stops 205. Stops 205 may be configured to limit the rotation of link 120. Link 120 may include supports 207 positioned between the mounting brackets, wherein supports 207 may be protrusion, outcrop, etc. Responsive to supports 207 being positioned adjacent to stops 205, the rotation of link 120 may be limited, wherein the supports 207 may be internally positioned within link 120.

Figure 3:
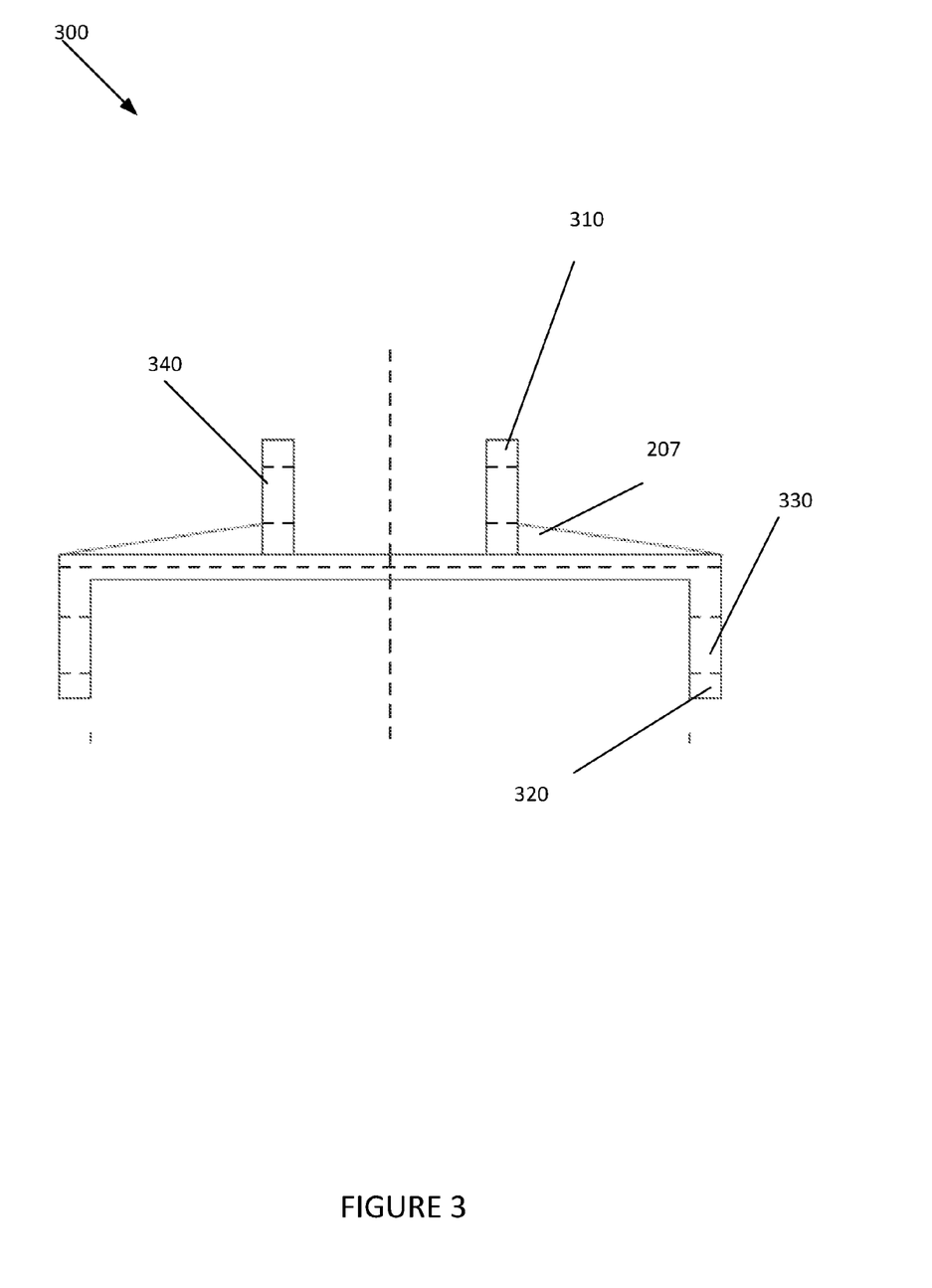
FIG. 3 depicts a link, according to an embodiment.

FIG. 3 depicts a link 300, according to an embodiment. Elements depicted in FIG. 3 may be substantially similar to other elements described elsewhere. For the sake of brevity, an additional description of these elements is omitted.

As depicted in FIG. 3, link 300 may include a first end 310 and a second end 320, wherein the widths of first end 310 and second end 320 have different widths. In embodiments, second end 320 may include mounting orifices 330 and first end 310 may include mounting orifices 340. There may be a greater distance between mounting orifices 330 than that of mounting orifices 340.

The width of first end 310 may be configured to correspond to a width of a projection on a pipeline bracket. The width of second end 320 may be configured to correspond to the size of one or more tie-down straps. Accordingly, by varying the width of second end 320 of link 300, link 300 may be configured to secure pipelines requiring different sized tie-down straps. Thus, by increasing the width of the tie-down straps, link 300 may be configured to secure larger pipelines. For example, link 300 may be able to support a larger tie-down strap positioned on a mounting bolt positioned through mounting orifices 330.

Figure 4:
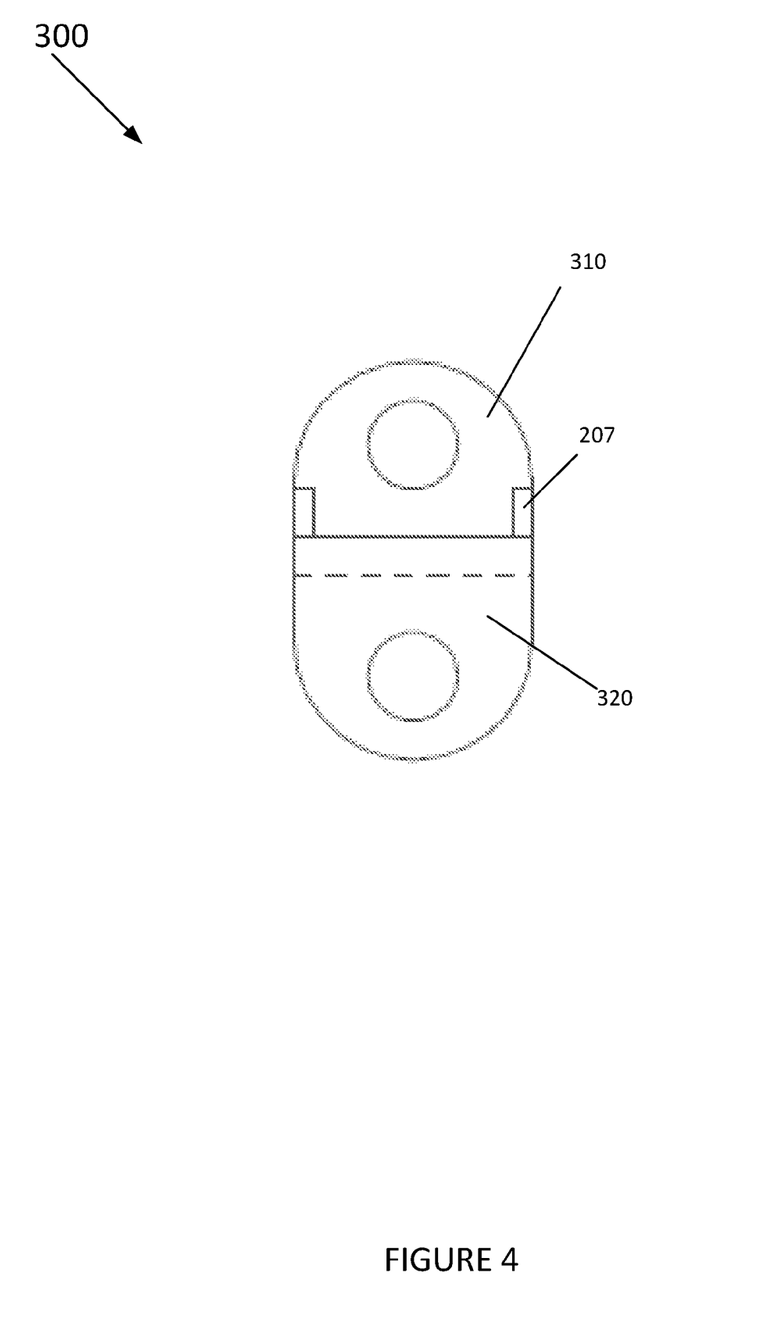
FIG. 4 depicts a side view of a link, according to an embodiment.

FIG. 4 depicts a side view of link 300, according to an embodiment. Elements depicted in FIG. 4 may be substantially similar to other elements described elsewhere. For the sake of brevity, an additional description of these elements is omitted.

As depicted in FIG. 4, the orifices 330, 340 within link 400 may be aligned such that removable bolts may be inserted through them. Accordingly, a removable bolt may be inserted through the orifices on the first end 310 or second end 320 of link 300, and extend through link 300. If the removable bolt or the corresponding tie-down strap becomes worn, damaged, etc., the bolt may be removed and replaced with a new removable bolt. Thus, it may not be necessary to replace and entire pipeline bracket or link 300, when only portions of the pipeline bracket or link need to be replaced.

Figure 5:
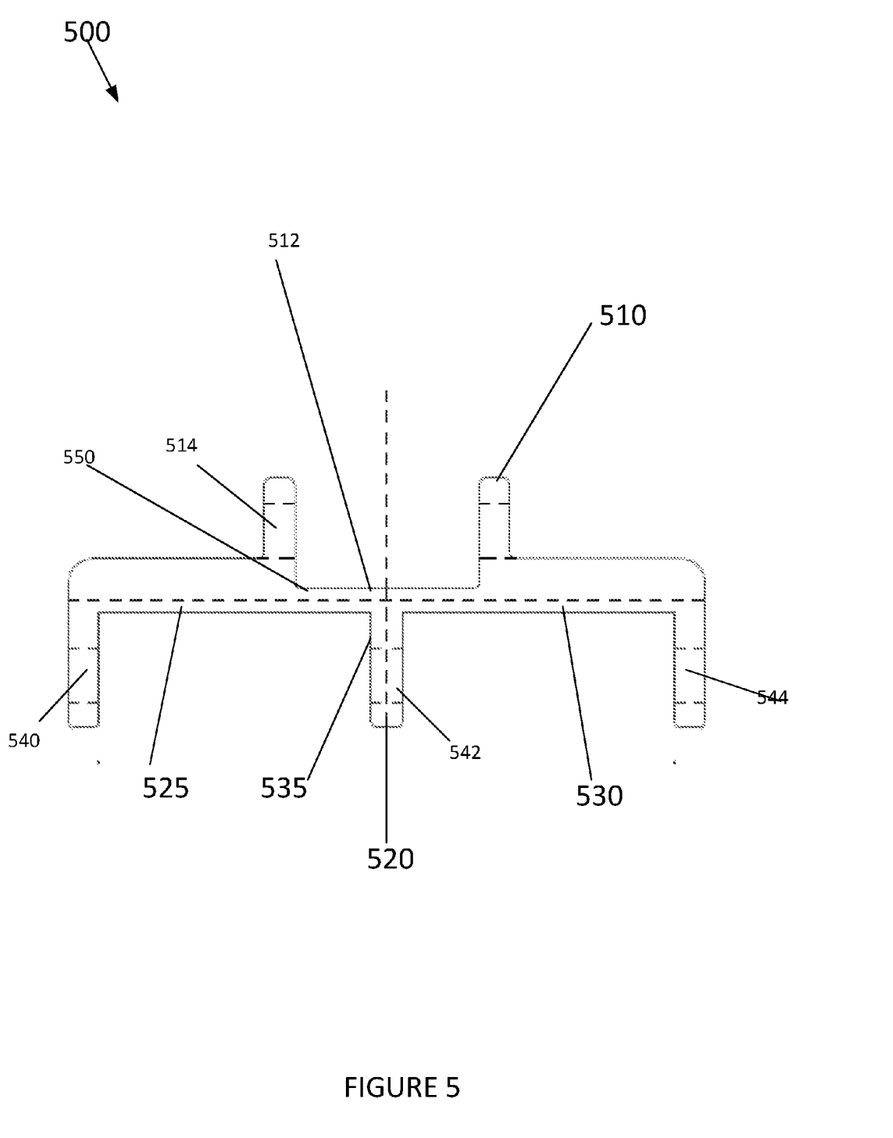
FIG. 5 depicts a link, according to an embodiment.

FIG. 5 depicts a link 500, according to an embodiment. Elements depicted in FIG. 5 may be substantially similar to other elements described elsewhere. For the sake of brevity, an additional description of these elements is omitted.

As depicted in FIG. 5, link 500 may include a first side 510 and a second side 520. First side 510 of link 510 may include a slot 512, channel, groove, etc. that is configured to encompass a lug sleeve. For example, a lug sleeve may be configured to be inserted into slot 512, and a removable bolt inserted through orifices 514 and the lug sleeve. This may couple the lug sleeve with link 500.

Second side 520 of link 510 may include a first slot 525 and a second slot 530, which may be separated by partition 535.

First slot 525, second slot 530, and partition 535 may each include a corresponding and aligned orifice 540, 542, 544. First slot 525 and second slot 530 may be configured to each independent secure a different tie-down strap. Responsive to coupling link 500 with a lug sleeve, the tie-down straps coupled within first slot 525 and second slot 530 may both be rotated simultaneously, wherein the different tie-down straps may disperse the load of the pipeline.

In embodiments, a mounting bolt may be configured to extend from an outer sidewall of first slot 525 via orifice 540, through partition 535 via orifice 542, to an outer sidewall of second slot 530 via orifice 544. Therefore, a single mounting bolt may be utilized to couple multiple tie-down straps with link 500. In embodiments, the orifice 540 within the outer sidewall of first slot 525, the orifice 544 with the outer sidewall of second slot 530, and the orifice 542 with partition may be aligned with each other and positioned away from the main body 550 of link 500. Utilizing the spacing between the orifices and the main body 550 of link 500, the tie-down straps may be able to be inserted and/or angled away from the first side 510 of link 500.

Figure 6:
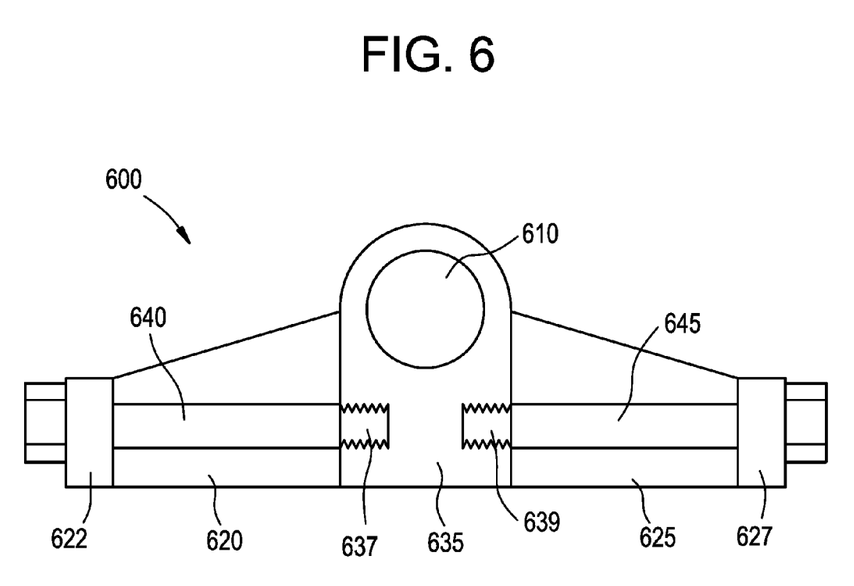
FIG. 6 depicts a pipeline bracket, according to an embodiment.

FIG. 6 depicts a pipeline bracket 600, according to an embodiment. Elements depicted in FIG. 6 may be substantially similar to other elements described elsewhere. For the sake of brevity, an additional description of these elements is omitted.

As depicted in FIG. 6, bracket 600 may include an orifice 610 that is configured to receive an extension rod. Bracket 600 may include a first slot 620, a second slot 625, which may be separated by partition 535.

First slot 620 may include an orifice 622 extending through an outer sidewall, and second slot 625 may have an orifice 627 extending through an outer sidewall. In embodiments, each of the outer sidewalls of partition 635 may have threaded orifices 637, 639. Threaded orifices 637, 639 may or may not extend through partition 635.

In embodiments, a first mounting bolt 640 may be configured to be inserted through orifice 622 and screwed into threaded orifice 637. A second mounting bolt 645 may be configured to be inserted through orifice 627 and screwed into threaded orifice 639. Accordingly, bracket 600 may be configured to support two independent mounting bolts 640, 645, wherein both mounting bolts 640, 645 or a single mounting bolt may be coupled to bracket 600. Thus, bracket 600 may support multiple tie-down straps at the same time or a single tie-down strap. Alternatively, multiple links may be inserted into first slot 620 and/or second slot 630, such as conventional "Y" shaped links.

Figure 7:
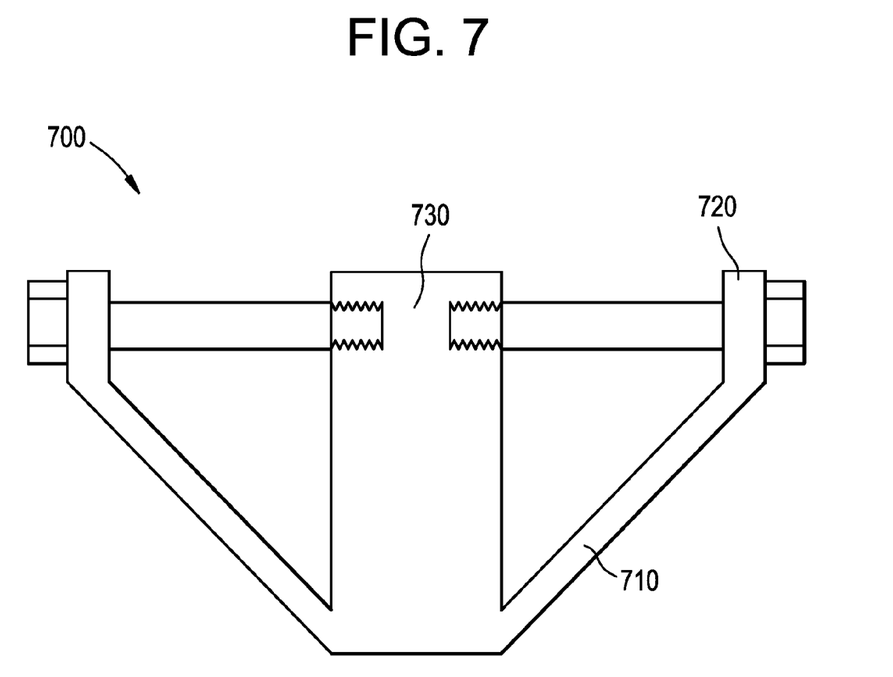
FIG. 7 depicts a pipeline bracket, according to an embodiment.
Figure 8:
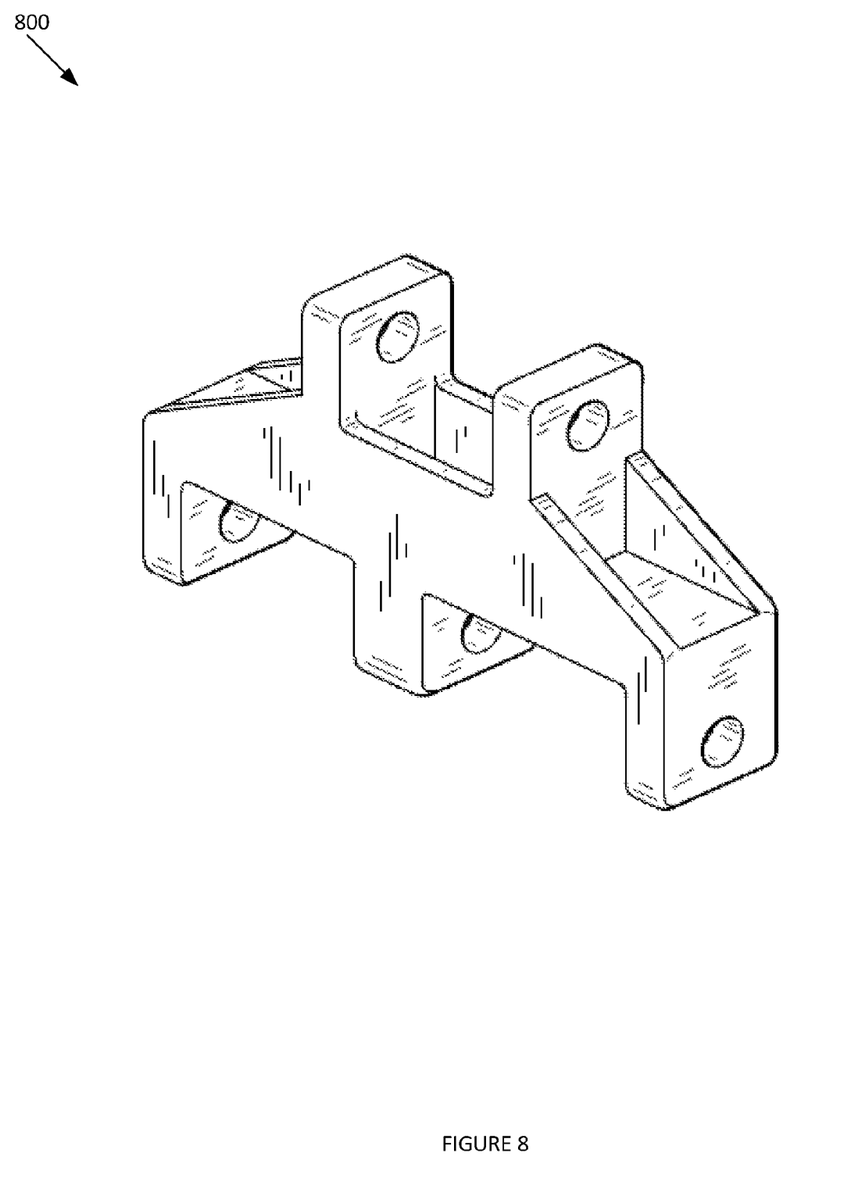
FIGS. 8-12 depict a link, according to an embodiment.
Figure 9:
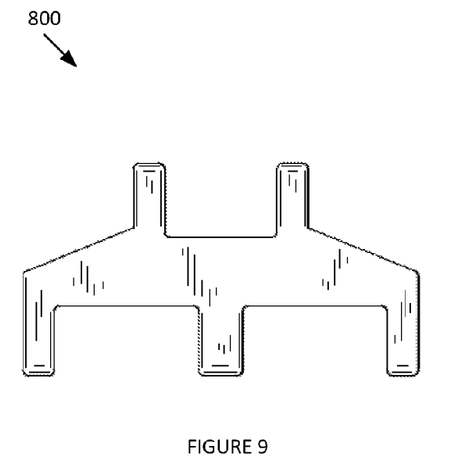
Figure 10:
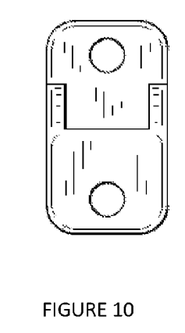
Figure 11:
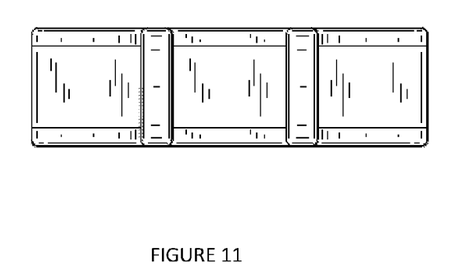
Figure 12:
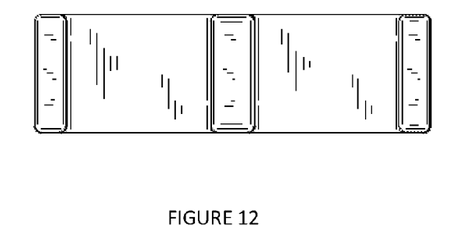

FIG. 7 depicts a bracket 700, according to an embodiment. Elements depicted in FIG. 7 may be substantially similar to other elements described elsewhere. For the sake of brevity, an additional description of these elements is omitted.

As depicted in FIG. 7, bracket 700 may include two independent slots separated by a partition 730. Each slot may include wings 710 that are configured to increase the width of the corresponding slot, such that a bolt may be inserted through the slot. Each wing 710 may also include a projection 720, wherein projection 720 may be a planar surface, such that a face of an inserted bolt may be flush against the projection.

FIGS. 8-12 depict a link 800, according to an embodiment. Elements depicted in FIG. 8-12 may be substantially similar to other elements described elsewhere. For the sake of brevity, an additional description of these elements is omitted.

As depicted in FIGS. 8-12, link 800 may have first orifices positioned on a first end of link 800, and second orifices positioned on a second end of link 800. The distances between the second orifices may be the same or different widths. Furthermore, the distances between the second orifices may be greater than, equal to, or less than the distance between the first orifices.

Figure 13:
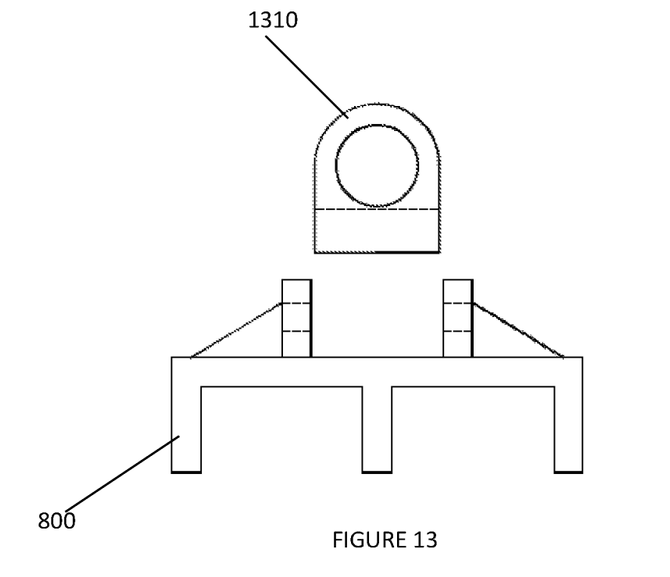
FIG. 13 depicts a pipeline system, according to an embodiment.
Figure 14:
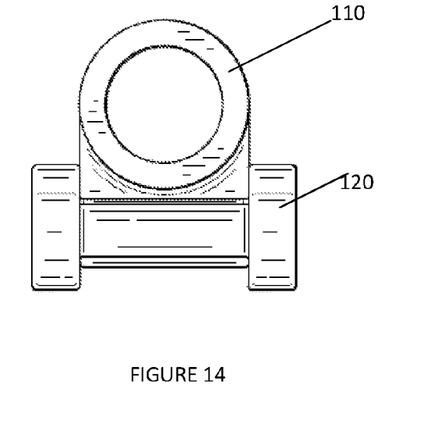
FIGS. 14-18 depict a pipeline system, according to an embodiment.
Figure 15:
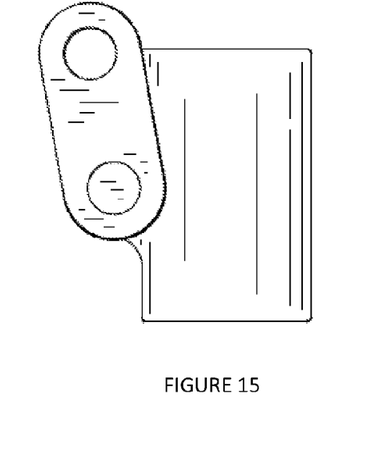
Figure 16:
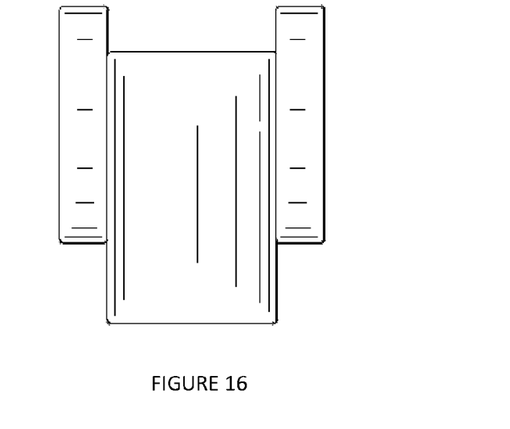
Figure 17:
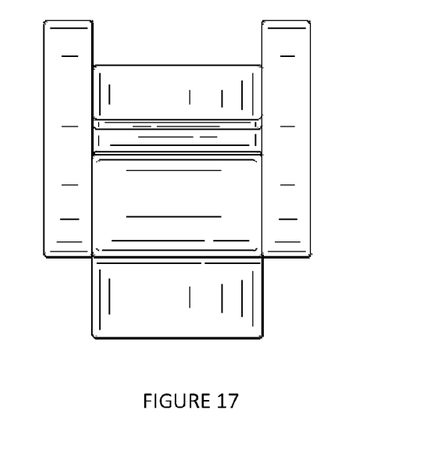
Figure 18:
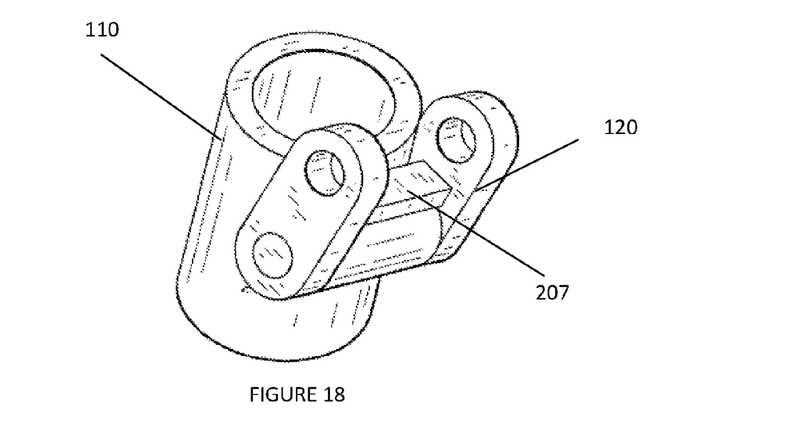

FIG. 13 depicts a link 800 coupled to a lug sleeve 1310, according to an embodiment. Elements depicted in FIG. 13 may be substantially similar to other elements described elsewhere. For the sake of brevity, an additional description of these elements is omitted.

As depicted in FIG. 13, a lug sleeve 1310 may be configured to be positioned within a first slot of link 800, such that a mounting bolt may be removably inserted through the first orifices and a hollow channel extending through the lug sleeve.

FIGS. 14-18 depict a lug sleeve 110 and link 120, according to an embodiment. Elements depicted in FIG. 14-18 may be substantially similar to other elements described elsewhere. For the sake of brevity, an additional description of these elements is omitted.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

Reference throughout this specification to "one embodiment", "an embodiment", "one example" or "an example" means that a particular feature, structure or characteristic described in connection with the embodiment or example is included in at least one embodiment of the present invention. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or sub-combinations in one or more embodiments or examples. In addition, it is appreciated that the figures provided herewith are for explanation purposes to persons ordinarily skilled in the art and that the drawings are not necessarily drawn to scale.

What is claimed is:

1. A pipeline system, comprising:
a lug sleeve configured to couple with an extension rod of an anchor, the lug sleeve including a hollow chamber extending through a longitudinal axis of the lug sleeve in a first direction and projections, the projections including link mounting channel;
a link configured to be coupled with the lug sleeve and a tie down strap, the link including a first end and a second end, the first end of the link having a longer width than that of the projections and including lug sleeve mounting orifices, the lug sleeve mounting orifices being configured to align with the link mounting channel, the second end of the link including tie down mounting orifices, the lug sleeve mounting orifices being configured to receive a first removable mounting bolt, and the tie down mounting orifices being configured to receive a second removable mounting bolt, wherein the link is configured to rotate between zero and one hundred sixty degrees around an axis defined by the first removable mounting bolt, wherein the second end of the link includes two slots, a first slot being positioned between a first mount and a partition, and a second slot being positioned between a second mount and the partition and widths of the first slot and second slot are greater than a width of the first end, wherein the first end of the link includes a third slot configured to receive the projections of the lug sleeve, a sidewall of the third slot being recessed within an inner surface of a main body of the link, the main body of the link includes tapered ends, and first sides of the tapered ends is co-planer with the sidewall of the third slot, and second sides of the tapered ends are vertically positioned between the sidewall of the third slot and upper surfaces of the first slot and the second slot.

2. The pipeline system of claim 1, wherein the lug sleeve mounting orifices are positioned adjacent to an outer surface of the main body of the link.

3. The pipeline system of claim 2, wherein the sidewall of the third slot is misaligned with the outer surface of the main body of the link.

4. The pipeline system of claim 1, wherein the tapered ends are configured to limit the rotation of the link.

5. The pipeline system of claim 4, wherein when the tapered ends are positioned adjacent to the lug sleeve, the link us unable to rotate.

* * * * *